UNBALANCED D.C. PUSHBUTTON-SELECTION SYSTEMS
Filed June 5, 1963 2 Sheets-Sheet 1
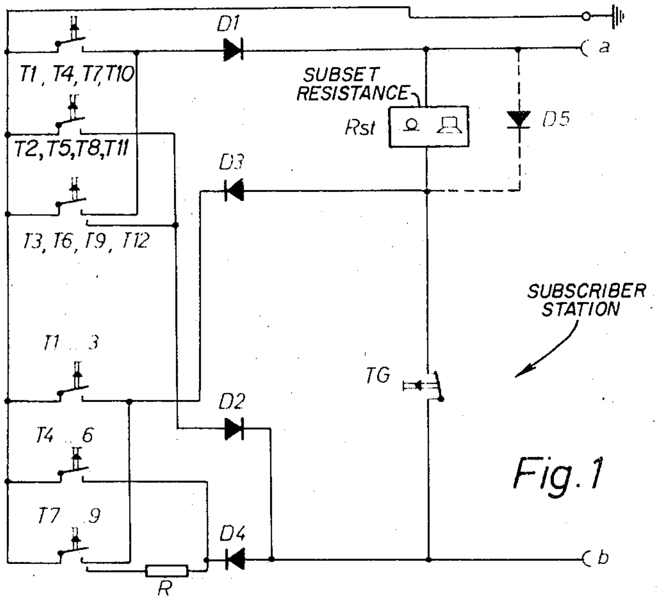
Fig. 1
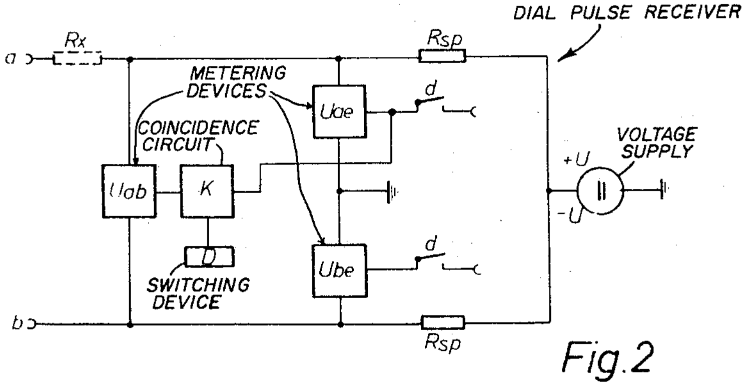
Fig. 2
| T | 1 | 2 | 3 | 4 | 5 | 6 | 7 | 8 | 9 | 10 | 11 | 12 | T1 ... 9, TG closed |
|---|---|---|---|---|---|---|---|---|---|---|---|---|---|
| 1. +U | a | | | b | | | a+b | | | — | | | a+b |
| 2. -U | a | b | a b | a | b | a b | a | b | a b | a | b | a b | |
| Uab | | | | | | | – | | | | | | + |
Fig. 3
INVENTOR
Eberhard Herter
BY Philip A. Weiss
ATTORNEY Jan. 3, 1967 E. HERTER 3,296,383

UNBALANCED D.C. PUSHBUTTON-SELECTION SYSTEMS

Filed June 5, 1963 2 Sheets-Sheet 2

INVENTOR
Eberhard Herter

BY Phillip A. Weiss
ATTORNEY

United States Patent Office 3,296,383
Patented Jan. 3, 1967

3,296,383

UNBALANCED D.C. PUSHBUTTON-SELECTION SYSTEMS

Eberhard Herter, Stuttgart, Germany, assignor to International Standard Electric Corporation, New York, N.Y., a corporation of Delaware Filed June 5, 1963, Ser. No. 285,827
Claims priority, application Germany, June 16, 1962, St 19,370
11 Claims. (Cl. 179—84)

The present invention relates in general to telephone systems and more particularly to unbalanced D.C. pushbutton-selection systems in which the current which flows in both directions, via individual conductors of the transmission line, is utilized for signalling purposes. The code signals which are formed in an unbalanced way, are evaluated with two interrogating steps, each in different current directions.

One problem arising in signal-transmission systems is the type signal used to indicate the signalling condition at the receiving end. For this purpose most of the conventional types of unbalanced signal-transmission methods use loop interruption. This criterion is received by the receiving equipment, and is used for initiating the interrogation. This conventional method, however, has the disadvantage that a different sequence of actuation of the individual contacts of a selecting pushbutton can inadvertently and prematurely cause the indicating criterion to be transmitted upon application of grouind to one conductor. Then upon evaluation, it is erroneously ascertained that ground is applied to both conductors, because the loop is not yet opened. To avoid this disadvantage one conventional signalling method provides resistors within the signalling circuit of the transmitting station, in order to prevent the equipment evaluating the signal indicating the depression of the pushbutton key, from becoming responsive upon application of ground to one conductor.

This is not only causes the system to be more susceptible to interference with respect to the evaluation of the signal indicating the depression of the pushbutton keys, but the noise voltages appearing on the line also have a stronger detrimental effect upon the signal transmission.

An object of the present invention is to provide new and useful unbalanced D.C. pushbutton-selection systems.

Another object of the present invention is to provide unbalanced D.C. pushbuton-selection systems that are less susceptible to noise.

It is a more particular object of the present invention to provide unbalanced D.C. pushbutton-selection systems for use in telecommunications, particularly telephone systems that employ unambiguous signals to indicate the recognition of a depressed pushbutton key, without any reduction of the unbalanced signal currents.

According to an embodiment of the inventive system, this is accomplished in that the voltages "conductor to ground" and the voltage "conductor to conductor" act upon a coincidence circuit which, in the absence of one or more of these signal conditions, produces a start signal for initiating the evaluation. The supervision of the loop conditions with the coincidence circuit prevents the evaluation of the existing signal except upon interruption of the loop.

As is shown by a further embodiment of the system, it is also sufficient if only one voltage "conductor to ground" acts upon the coincidence circuit. The unbalance of the signal-transmitting circuit that occurs during the loop interruption changes one of the signal conditions acting upon the coincidence circuit. The unbalance is achieved in that ground to the one conductor (*a*-wire) for the first interrogation-current direction, is always applied via the station circuit. To keep the resistance very low, the station circuit may be by-passed by a rectifier which is conductive in the first interrogation-current direction. In this connection it is to be noted that in the inoperative signal condition the same voltage is applied for recognizing the depression of the pushbuttons. To distinguish between the pushbutton depression and the starting signal in the cases of the signals with ground applied to both conductors in the first interrogation step, the invention provides, with the aid of an additional resistor, and subsequent to the loop interruption, that the unbalance of the transmitting circuit changes in such a way that the polarity of the voltage "conductor to conductor" reverses. On account of this, the evaluation is released in this case also via the coincidence circuit. The value of the aforementioned additional resistor within the signal circuit must be chosen somewhat higher than the station resistance. By inserting an auxiliary resistor in the one conductor (*a*-wire) of the supply circuit it is possible to increase the effect of the station resistance still further. According to the invention, the station resistance may also be replaced by an ohmic resistance.

The voltage "conductor to conductor," in accordance with a further embodiment of the system, may also be used as an additional code element for effecting the signal transmission.

The fact that the recognition of the pushbutton depression is separated from the start signal in the course of the evaluation, has a particularly favorable result in register-types of systems. According to the invention, the recognition of the pushbutton depression is accomplished in a receiver portion assigned to the line. The start signal as well as the code signal are evaluated in a central receiver capable of being connected responsive to the reception of a signal. In this way there is no time delay as a consequence of the connection of the central receiver. The connection is already initiated by the recognition of the pushbutton depression. In order to accelerate the release of the central receiver, the evaluated signal is re-transmitted to the connecting link of the line, where there is the supervision with respect to the end of the signal. The end of the signal is indicated by a new variation of the voltages "conductor to ground."

A preferred embodiment of the inventive system will now be explained in detail with reference to FIGS. 1–4 of the accompanying drawings, in which:

FIG. 1 shows a circuit arrangement of a signal-transmitting station;

FIG. 2 shows a receiving arrangement in a basic circuit diagram;

FIG. 3 shows the signal code; and

Figure 4:
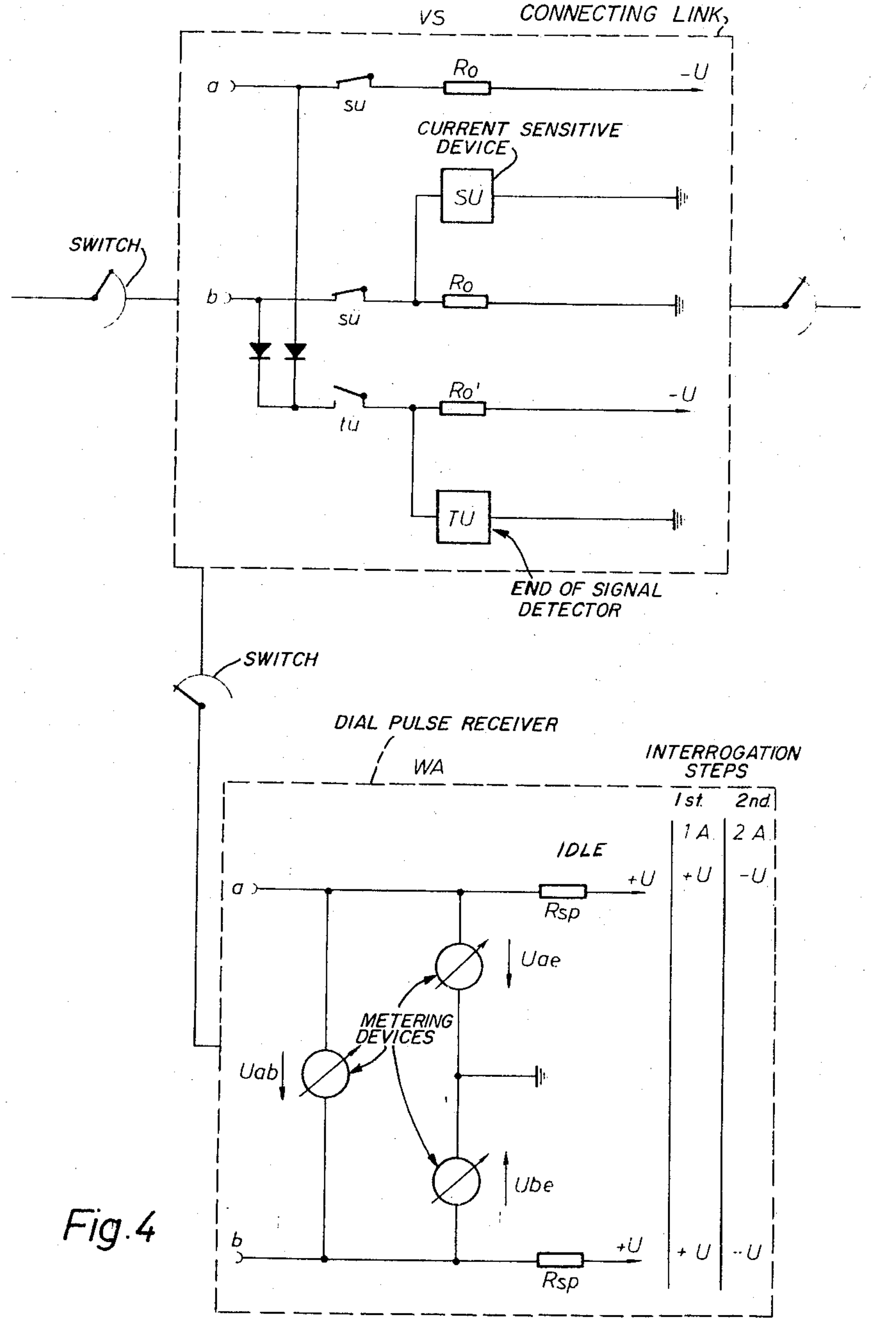
FIG. 4 shows the cooperation between the connecting link and the central receiver portion.

FIG. 1 shows the circuit arrangement of the pushbutton subset. The components necessary for performing the communication are assembled in the circuit of the subset (station circuit) R*st*. Twelve different code signals are formed via the pushbutton contacts T1 . . . T12. The code signals are composed of elements which become effective in one and/or other current direction at the one and/or other conductor. As is best shown in FIG. 2, the interrogation of the code signals is effected in two different current directions. That is, the receiving arrangement of FIG. 2 in the first interrogation supplies both lines *a, b* with positive voltage through resistors RSP. In the second interrogation, both lines *a, b* are supplied with negative voltage. This can be accomplished in any well known manner such as by using a relay which in the idle condition connects both lines to positive battery and upon actuation connects both lines to negative battery. In the first interrogation current direction the code elements one, both or no conductor of the transmission line in a grounded fashion are utilized, whereas, in the second interrogation current direction the elements one, or both conductors in a grounded fashion are utilized, for effecting the signal transmission. The code itself is shown in FIG. 3.

To transmit a signal one pushbutton of the subset is actuated, and the code signal is formed via the diodes D1 . . . D4 (FIG. 1). However, the code signal may only be evaluated after the loop has been interrupted by the contact T*g* which is actuated by any of the pushbuttons. For example, if the pushbutton T1 is actuated (depressed), then ground potential is applied to the *a*-conductor via the diode D3 and the station or subset resistance R*st*. The pushbutton depression is recognized via the voltage-measuring (metering) device U*be* (FIG. 2), even if the contact T*g* has not yet opened. The devices U*ae*, U*be* can be any type of threshold device which is actuated when the respective associated line is grounded. The evaluation of the code signal, however, does not start yet, because the ground potential still acts upon both conductors via the closed contact T*g*. In this circuit condition the voltages U*ae* and U*ab* act upon the coincidence circuit K. Coincidence circuit K may be any well known circuit requiring a definite difference in the signal level and/or direction at its two inputs in order to operate. Since an unbalance of the signal circuit is enforced by the station resistance R*st* and the additional resistance R*x*, the voltage U*ab* and the voltage U*ae* are both positive. The coincidence circuit, therefore, is blocked as long as these two signal conditions last. Upon opening of the contact T*g*, the *a*-conductor practically remains grounded, whereas the *b*-conductor practically assumes the potential +. By changing the polarity of the voltage U*ab*, the coincidence circuit K is unblocked, and the evaluation is initiated via the switching means D which may be a relay. In the second step of the interrogation a polarity reversal of the interrogating voltage is also effected.

Upon actuation of one of the signal pushbuttons T4 . . . T6 only the *b*-wire is grounded with respect to the first interrogating current direction. As long as the contact T*g* remains closed, the coincidence circuit K is blocked by the voltages U*ae* and U*ab* as described hereinbefore. The depression of the pushbuttons is recognized via the voltage variation U*be*. Upon opening of the contact T*g* the *b*-wire remains at ground potential and the *a*-wire assumes the potential +U. The evaluating device U*ae* is a threshold circuit which is capable of distinguishing between the two conditions "*a*-wire grounded," and "*a*-wire non-grounded." The coincidence circuit K is released for operation when the voltage rises on the *a*-wire, while the voltage across lines *a, b* remains the same.

The conditions upon actuation of the pushbuttons T7 . . . T9 are similar, with *a*-wire and *b*-wire being grounded. By inserting an additional resistance R having a larger resistance than the subset, into the *b*-wire it is achieved that the voltage U*ab* reverses polarity upon opening of the contact T*g*. Thus, with respect to these signals, both the recognition of the pushbutton depression and the start signal are unambiguously determined for the evaluation purpose.

In the case of the signals 10 . . . 12 ground is not involved as regards the first interrogation current direction. Independently of the circuit condition of the pushbutton contact T*g*, the voltage U*ae* practically immediately assumes the value +U, so that both the recognition of the pushbutton depression and the start signal coincide with respect to time. As may be taken from this explanation it is impossible in any signal condition that faulty output information will appear at the receiving end on account of a different sequence of actuation of the contacts. The beginning of the depression of the pushbutton and the completed pushbutton depression is always distinguishable by both the recognition of the pushbutton depression and the start signal.

As is best illustrated in FIG. 4, the D.C. pushbutton-selection method according to the invention may be advantageously used in register-types of systems. Upon initiating the establishment of a connection, a connecting link VS is seized by the calling or requesting line. This switching circuit performs the supervision with respect to the beginning of the pushbutton depression. For example, when a subscriber station demands service (off-hook condition) the switch connecting the calling line to the connecting link is operated to interconnect the calling line and the connecting link. Current immediately flows through lines *a, b* over a circuit that extends from battery —U, upper resistor RO, upper contact SU, line *a* to the subscriber station, subscriber station equipment RST, closed contact TG, line *b* back to the connecting link VS over contact SU over resistor RO to ground. The duration of any pushbutton, such as T1, diminishes the current flow in line *b* since a lower resistance circuit is then available. The lower resistance circuit extends through —U battery, upper resistor RO, upper contact SU, line *a* to the subscriber station through diode D1, contact T1 to ground. The current reduction in the *b*-conductor or wire appearing in the course of this is evaluated by a device SU. The connection of a central dial-pulse receiver WA is initiated, and the supply is effected with the voltage +U. At the central dial-pulse receiver WA, as already described hereinbefore, the evaluation of the existing code signal is made dependent upon the start signal. This signal is derived via the voltages U*ab* and U*ae*. The voltage U*be* is evaluated in the manner known per se. The code signal is retransmitted to the connecting link. A device TU in the connecting link VS determines the end of the signal, which is characterised by the variation of the voltages "conductor to ground." In this way the seizure of the central dial-pulse receiver WA can be initiated immediately upon recognition of the pushbutton depression, without the exact connecting-through of all contacts at the transmitting end having to be taken into consideration. In addition thereto, the central dial-pulse receiver WA can be released immediately upon evaluation of the code signal.

While I have described my invention in conjunction with specific apparatus, it is to be clearly understood that this description is made only by way of example and not as a limitation on the scope of the invention.

What is claimed is:

1. A signalling arrangement for a pushbutton-dialing system comprising central office equipment serving a plurality of two conductor lines, each of said two conductor lines having a subscriber station thereon, voltage supply means in said central office for selectively connecting a positive voltage or a negative voltage to each line of said two conductor lines, a plurality of pushbuttons in each of said subsets, single pushbutton means in said subscriber stations operated responsive to the operation of any pushbutton in said subset, said pushbuttons selectively operable to mark said two conductor lines in desired permutations and combinations, said permutations and combinations comprising individually grounding the first conductor, individually grounding the second conductor, grounding both conductors simultaneously, grounding neither conductor and connecting both conductors together, receiving means in said central office, said receiving means comprising a first metering device for detecting wire to ground voltage on a first of said two conductors, second metering device for detecting wire to ground voltage on the second of said two conductors, third metering device for detecting wire to wire voltage and evaluation means operated responsive to variations in said detected voltages for generating a code evaluation start signal.

2. The signalling arrangement of claim 1, said evaluation means comprising coincidence circuit means operated responsive to the variation in the wire to wire voltage and to said first wire to ground voltage.

3. In the pushbutton-selection system of claim 1 wherein said voltage supplies current in a first and a second direction.

4. In the system of claim 3 wherein ground is applied to said first wire through said subset circuit responsive to the depression of at least one of said pushbuttons, while said positive voltage is connected to said conductors.

5. In the system of claim 4 wherein said subset is bridged by a rectifier conductive in the direction of said current.

6. The pushbutton-selection system of claim 3 having resistance means connected in series in said second wire responsive to the operation of a second one of said pushbuttons and means for connecting both of said wires to ground responsive to the operation of said second of said pushbuttons while said current is flowing in said first direction.

7. In the pushbutton-selection system of claim 6 means for grounding said first wire responsive to the operation of a third of said pushbuttons while said current is flowing in said first direction and means responsive to the operation of said single pushbutton means for varying said voltage on said first wire.

8. In the pushbutton-selection system of claim 7 wherein an auxiliary resistance means is series connected in said first wire.

9. The arrangement of claim 8 having link means assigned to said lines and means in said link for recognizing the depression of a pushbutton connected to said link.

10. In the pushbutton-selection system of claim 9 wherein means are provided in said link means for detecting the end of a code signal, wherein said end of code detecting means operates responsive to variations of the voltages of the first wire to ground and of the second wire to ground.

11. In the pushbutton-selection system of claim 6 wherein said resistance means has a higher value than the resistance of the subsets.

References Cited by the Examiner

UNITED STATES PATENTS 3,011,028 11/1961 Boswau ------------ 179—90.3

KATHLEEN H. CLAFFY, *Primary Examiner.*

H. ZELLER, *Assistant Examiner.*